Dec. 30, 1969  W. G. PONTIS  3,487,245
NUTATING SHAFT FLUID FLOW METER WITH SHAFT TRANSDUCERS
Filed May 19, 1965  3 Sheets-Sheet 1

INVENTOR.
WILLIAM GRANT PONTIS
BY
*Kinney & Schenk*
ATTORNEYS

Dec. 30, 1969   W. G. PONTIS   3,487,245
NUTATING SHAFT FLUID FLOW METER WITH SHAFT TRANSDUCERS
Filed May 19, 1965   3 Sheets-Sheet 2
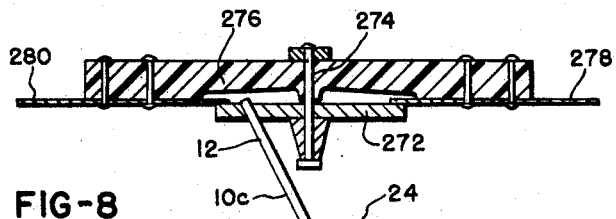
FIG-8
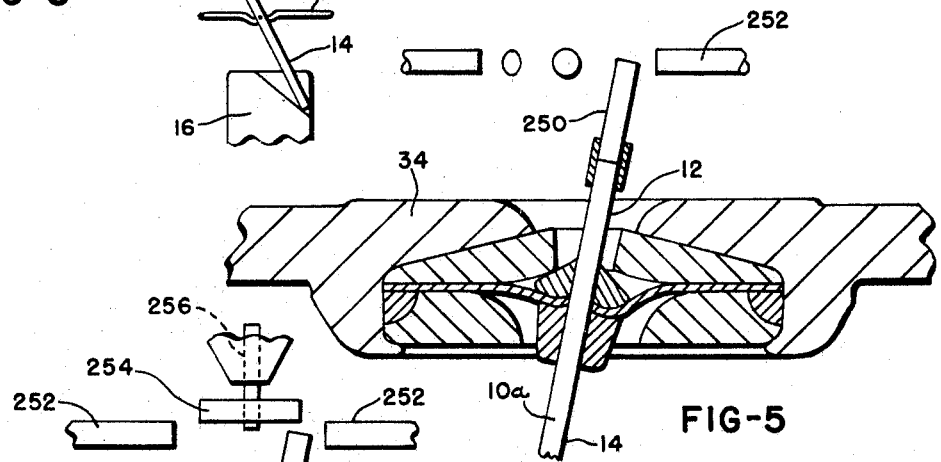
FIG-5
FIG-6
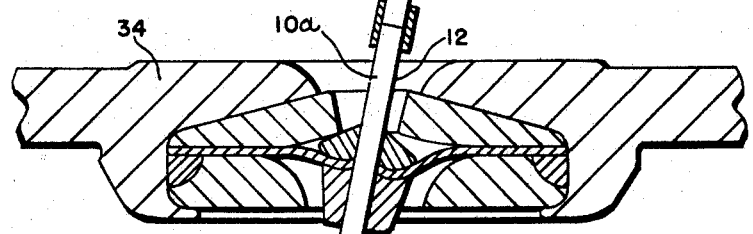
FIG-7
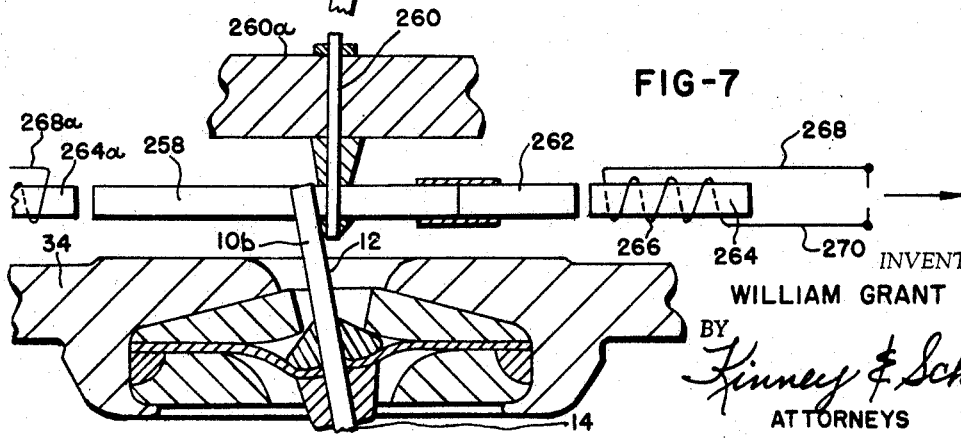
INVENTOR.
WILLIAM GRANT PONTIS
BY
*Kinney & Schenk.*
ATTORNEYS

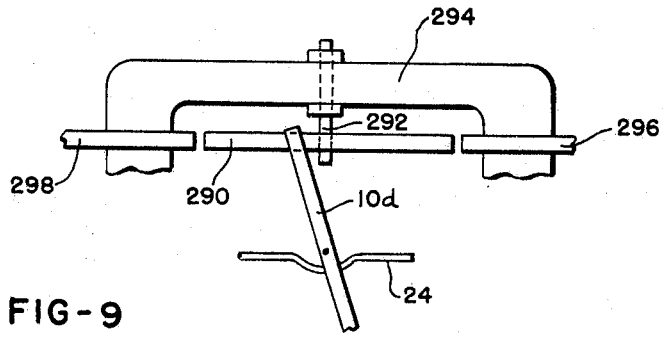
FIG-9
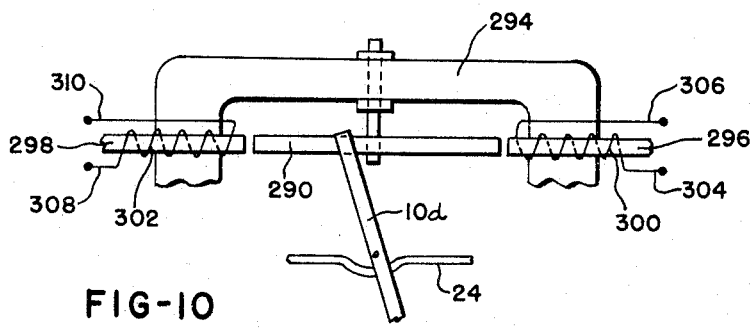
FIG-10
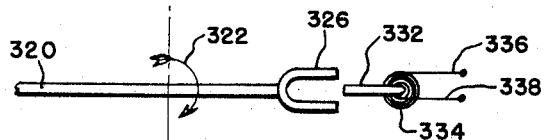
FIG-11
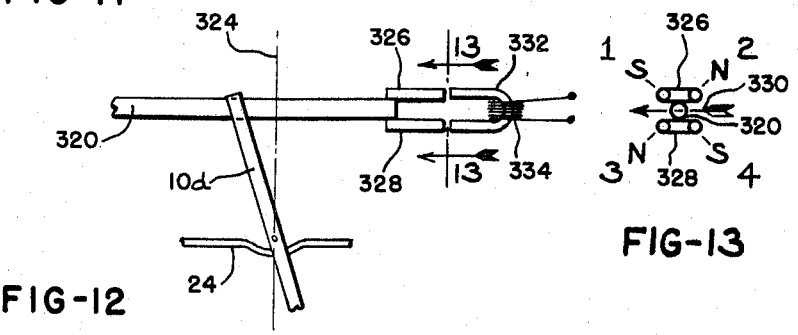
FIG-12
FIG-13
*INVENTOR.*
WILLIAM GRANT PONTIS
BY
*Kinney & Schenk*
ATTORNEYS

United States Patent Office 3,487,245
Patented Dec. 30, 1969

---

3,487,245
NUTATING SHAFT FLUID FLOW METER WITH SHAFT TRANSDUCERS
William Grant Pontis, 303 Wendy,
Waverly, Ohio 45690
Filed May 19, 1965, Ser. No. 457,122
Int. Cl. H02k 7/06
U.S. Cl. 310—82                8 Claims

ABSTRACT OF THE DISCLOSURE

A fluid measuring device having a coupling wherein the volume of fluid passing through the measuring device is measured and by means of the present coupling means transferred to another atmosphere or medium by means of a mechanical and magnetic means which transmits movement from one closed chamber to another thereby providing a transfer of power between said chambers with a minimum of vibration and loss of power.

---

This invention relates to a coupling means for fluid actuated and other devices.

An object of this invention is to provide a coupling means, when used in a fluid volume measuring device, for directly or remotely actuating a register or other devices mechanically, magnetically, electronically, electrically, or magneto-electrically in relation to the volume of fluid measured.

Another object of this invention is to provide separate coupling means for low torque and high torque demands of the register or other coupled devices.

A further object of this invention is to provide a coupling means for use when driving power must be transferred from a prime mover operating in one atmosphere or medium by means of a connecting shaft to another seal-separated atmosphere or medium without the use of stuffing boxes about the shaft and providing transfer of power with minimum vibration, wear, and loss of power.

Still another object of this invention is to provide a coupling means which, with appropriate minor modifications, will operate in a vertical, horizontal, inverted, or other position with either the prime mover end or the driven end being adaptable to be connected with available speed reducing gear trains or other mechanical, magnetic, electronic, electrical, or magneto-electrical mechanisms or devices.

A still further object of this invention is to provide a coupling means, which can be changed as to size and load demands to operate at minute load demands or at very high load demands such as might be used in industrial machinery or elsewhere.

Yet another object of this invention is to provide a coupling means whereby the magnetic, electrical, or electronic actuators are free from the adverse effects of electrolysis as in the case of parts functioning in current carrying fluids.

A yet further object of this invention is to provide a means to mechanically or magnetically transmit rotational motion from one closed chamber to another or from one section of a closed chamber to another with each chamber or section containing different fluids, different pressures, different temperatures, or vacuums wherein the fluid or vacuum in one section or chamber must be fully segregated from the other and such motion being transmitted without the use of stuffing boxes or the like.

Still another object of this invention is to provide complete seal-separation of the fluid being measured from a chamber containing a different fluid or fluid at a different pressure or temperature and to provide mechanical or magnetic electric, or magneto-electric or electronic means within the separate chamber to directly or remotely actuate a register or other device in relation to the volume of fluid being measured.

A still further object of this invention is to provide accurate magnetic coupling means, when used in a fluid meter, to show the volume of fluid passing through the meter measuring chamber wherein a portion of a nutating shaft that is driven by the measuring chamber mechanism is on one side of a completely sealed wall and an extending portion of the same nutating shaft, on which is mounted a driving magnet, is on the other side of the sealed wall in an atmosphere that does not relate to or contain the fluid being measured.

Yet another object of this invention is to provide a means whereby when a nutating shaft is in action in one chamber it is at the same time in action within a separate and sealed chamber. This may be used where a transmitting coupling between two seal-separated environments is required.

A yet further object of this invention is to provide a magnetic coupling wherein a driving magnet is attached to a nutating shaft within an atmosphere, fluid, or chamber which is different from the atmosphere, fluid, or chamber in which the prime mover of the nutating shaft is located.

Other objects and features are apparent from this disclosure, the appended claimed subject matter, and/or the accompanying drawings, in which:

FIGURE 5 is a sectional view, partly diagrammatic, of another embodiment of the nutating construction in which magnetic impulses are motivated by a bar magnet affixed to the upper end of the nutating shaft.

FIGURE 6 is a view, somewhat similar to FIGURE 5, in which a rotary motion is additionaly produced directly on a shaft by rotary magnetic attraction.

FIGURE 7 is a view, somewhat similar to FIGURE 5, in which electrical impulses are generated by the rotary magnet.

FIGURE 8 is a view, somewhat similar to FIGURE 7, in which an electric circuit is directly controlled by a rotary circuit maker and breaker.

FIGURE 9 is an elevational view of another form of the nutating construction in which electrical impulses are generated by a rotary magnet.

FIGURE 10 is a view, somewhat similar to FIGURE 9, in which the impulses are transmitted through coils.

FIGURE 11 is a top plan view of another modification of the nutating construction in which an electrical signal is provided by a pair of rotating U-shaped magnets.

FIGURE 12 is a side elevational view of the embodiment of FIGURE 11.

FIGURE 13 is an elevational view taken along the line 13—13 of FIGURE 12.

Figure 1:
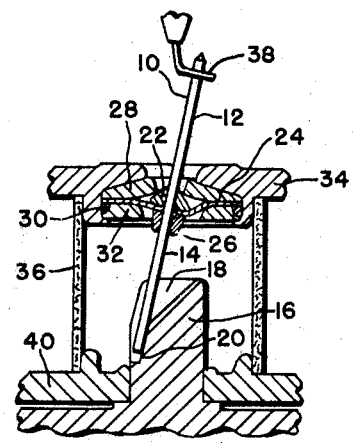
FIGURE 1 is a sectional view of the nutating coupling of the present invention.

FIGURE 1 shows a coupling assembly between a prime mover driver 16 in one chamber and an input drive arm of a driven element 38. The driven element 38 may be connected with a register or any other driven device.

A nutating shaft 10 has an upper portion 12, which operates within one environment, while a lower portion 14 is operated within a different environment. These separate environments may be within seal-separated chambers, or one end of the shaft 10 may be in an open atmosphere while the other end of the shaft 10 is in a sealed chamber or section thereof, or the coupling may form part of a system to measure, drive, or otherwise function between segregated fluids, segregated vacuums or combinations thereof or different pressures, temperatures, densities or other physical properties.

The upper portion 12 and the lower portion 14 are seal-separated by a nonpermeable, soft, pliable sheet or nonpermeable diaphragm 24, which is sealed to the nutating shaft 10 and to an environment separating wall 34. A retainer 26 secures and seals the diaphragm 24 to the nutating shaft 10. A retainer 32 secures a seal 30, which seals the diaphragm 24 to the separating wall 34.

There is a stationary raceway 28 disposed between the diaphragm 24 and the separating wall 34. A diaphragm mounting and nutating shaft bearing hub 22 is attached to the shaft 10 between the diaphragm 24 and the raceway 28.

The nutating shaft 10 has it lower end 14 positioned and engaged by a funnel 18 and a driving notch 20 in the driver 16.

The driver 16 may be rotated by any prime moving device. The driver 16 has its bearing in a wall 40. A filter 36 or other suitable means may be employed to enclose the prime mover end, which is the lower portion 14, of the shaft 10 and filter interfering foreign substances from entering the engaging parts of the driver device.

It should be noted that speed change ratio devices such as the means illustrated in my previous patent applications, may be drivingly coupled on either side of the chamber seal separating wall 34 to the nutating shaft 10 or to the prime mover of the nutating shaft 10 such as to the driver 16. It will be understood that any other driver means may be used with this invention that provides the required angular attitude of the nutating shaft 10.

Figure 2:
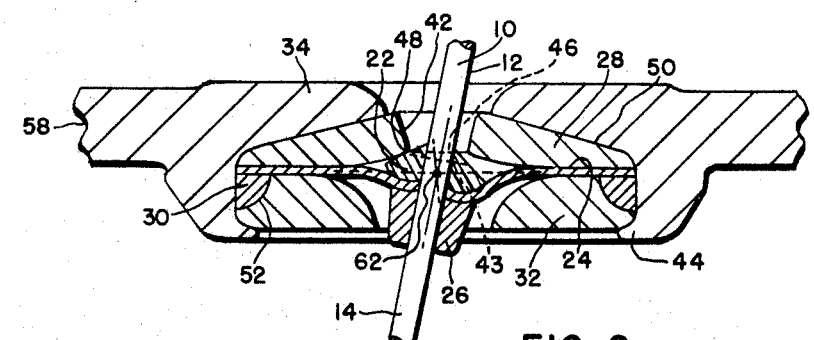
FIGURE 2 is an enlarged sectional view of a portion of the structure of FIGURE 1.
Figure 3:
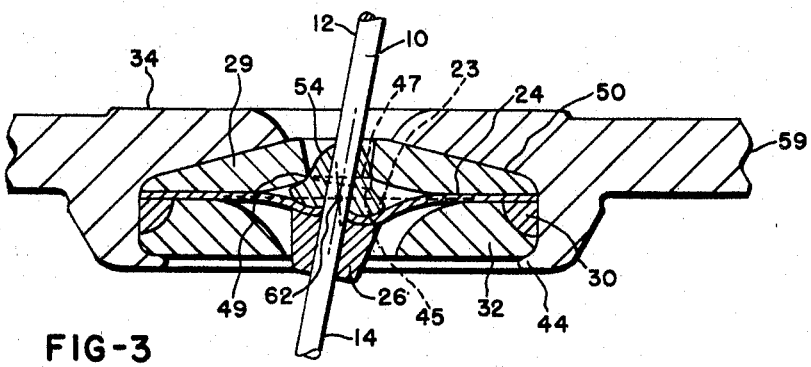
FIGURE 3 is a sectional view, similar to FIGURE 2, but showing another embodiment of the present invention.
Figure 4:
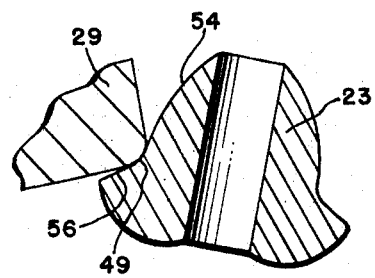
FIGURE 4 is an enlarged sectional view of a portion of the structure of FIGURE 3.

The details of construction of FIGURE 1 are shown in enlarged form in FIGURE 2. FIGURES 3 and 4 illustrate a high torque demand bearing arrangement. The application of magnetic or other means of using the power or motion, which is transferred through the nutating shaft 10 or its equivalent, is shown in FIGURES 5 through 13.

In past designs, the load carrying, incident to operating the driven element, was supported by arranging so that the nutating shaft bearing load was carried by an inner circular bearing within the aperture in the wall separating the environments. The former designs resulted in sliding friction where the nutating shaft bears against the surface within the aperture.

FIGURE 2 shows a low torque design for use where the driven element torque demand is minute. By contrast, FIGURE 3 shows a design for use where the driven element or elements require a relatively high driving torque demand.

WHEN THE TORQUE DEMANDS OF THE REGISTERING DEVICE ARE LOW

In FIGURE 2 the nutating shaft 10 is diaphragm-centered and the nutating shaft 10 does not touch an aperture 42 of the stationary raceway 28 in which the shaft 10 nutates. This is because the circular bearing hub 22 provides for a bearing circle 43 on its conical surface. This conical circular bearing surface at 48 carries a combined load of nutation driving and also the load resulting from the fluid pressure on the nonpermeable diaphragm 24.

The nutating shaft hub conical bearing circle 43 makes contact with the bearing circle 46 of the stationary raceway 28 at 48. These two bearing circles are substantially the same diameter. Therefore, there is no frictional sliding and, therefore, substantially no wear takes place between the bearing circles of the hub 22 and the raceway 28 at the point of contact 48. This is because the bearing contact is a rolling action. This new design reduces diaphragm stress and bearing wear to a negligible amount.

The combined centering effect of the diaphragm 24 together with the conical shape of the nutating shaft hub bearing circle 43 and the arcuate conical shape of the stationary raceway bearing circle 46, which is at the lower edge of the aperture 42, making contact at 48 having a combined effect of maintaining the centering of the nutating shaft 10. This combined function causes the apex center of shaft nutation to be substantially in the flat plane of the diaphragm 24 as indicated at 62.

For minute torque demand loads, the centering of the nutating shaft 10 is accomplished by the diaphragm 24 and the shaft hub conical bearing circle 43 rolling on the stationary conical raceway bearing circle 46 making contact at 48. The flexible diaphragm 24, mounted on the nutating shaft 10, functions with stress equalization. The nutating shaft 10 does not touch the aperture 42 in the stationary raceway 28 through which it passes.

WHEN THE TORQUE DEMANDS OF THE REGISTERING OR OTHER DEVICES ARE HIGH

In FIGURE 3, the load of nutation drive and the fluid pressure load on the nonpermeable diaphragm 24 are carried on a nutating shaft hub concave circular bearing represented by bearing circle 45 rolling on a convex circular bearing represented by bearing circle 47. These two bearings have their rolling points of contact at 49. The concave and convex bearing shapes may be reversed, if desired.

The diameters of the nutation shaft hub raceway bearing circle 45 and the stationary bearing circle 47 are substantially the same as in FIGURE 2. As is provided for in FIGURE 2, in FIGURE 3 there is substantially no frictional sliding and, therefore, substantially no wear takes place between the nutating shaft hub bearing circle 45 and the bearing stationary raceway circle 47 which make contact at 49.

An aperture pilot 54 is formed as part of hub 23, which is secured to the shaft 10, to stabilize the rolling point of contact at 49 and maintain the relationship to the rolling point of contact. The aperture pilot 54 maintains this rolling bearing point of contact because it is piloted within the raceway bearing diameter. The pilot 54 pilots, aligns, and maintains centering of the shaft 10 during nutation.

By contrast with FIGURE 2, which is a minute torque demand device, if a high torque load were imposed upon this drive (FIG. 2) depending upon the ratio of pressure on the diaphragm to the torque load, this shaft hub bearing circle, represented by the circle 43 in FIG. 2, could shift to cause the two bearing circles 43 and 46 to become substantially different in diameter. This would result in friction and wear. Also, this would impose an unbalanced stress on the diaphragm. This is avoided in the high torque structure shown in FIGURE 3.

In both FIGURE 2, operating at minute torque demand, and FIGURE 3, operating at relatively high torque demand, the diaphragm 24 functions with stress equalization. The functional physical relationship of the two parts of the bearings, represented by 43 and 46 in FIGURE 2 and 45 and 47 in FIGURE 3, being such that the diaphragm 24 tends to operate during nutation motion with stress equalization.

FIGURE 4 shows the enlargement of the diaphragm mounting and nutating shaft bearing hub 23 for high torque, also shows the aperture pilot 54 as part of the hub 23, and shows the bearing flange angular clearance between the flange portion of the hub 23 and the face of a stationary raceway 29, which is substantially similar to the raceway 28, at 56.

The design of the pilot 54 anticipates that the pressure on the prime mover side, which has the driver 16, of the diaphragm 24 is normally greater than the pressure on the driven element side (see 38 in FIGURE 1); if under system failure conditions, these pressures are reversed, the bearing contact at 49 might separate. In such cases, because the pilot 54 has a generally conical shape for centering, the pilot assures the repositioning of the bearing contact at 49 upon a return to normal operating conditions.

THE DIAPHRAGM ASSEMBLY

In FIGURES 1, 2, 3, 5, 6, and 7, the nonpermeable, nonstretchable, but flexible diaphragm 24 is securely held between the stationary raceway 28 (the stationary raceway 29 in FIGURE 3) and a diaphragm seal retainer 32, which is placed into assembly recess 50 and crimped securely at 44 to hold the diaphragm 24 firmly and nonrotationally in place. However, before the diaphragm seal retainer 32 is placed into the recess 50, the circular diaphragm seal gasket 30, which is a suitable flexible and sealing material, is placed adjacent the diaphragm 24 and this seal 30 is then sealingly formed in place, by a curved surface 52 (see FIGURE 2) of the retainer 32 and fixedly established by the crimp 44. The diaphragm retainer 26 is bonded to the shaft 10 and to the diaphragm 24. The shaft 10 may be knurled at the location of the hub 22 (the hub 23 in FIGURE 3).

In all figures, the upper portion 12 of the shaft 10 is above the diaphragm 24 and, therefore, in a meter may be in a dry atmosphere, which is isolated from the fluid being measured, while the lower portion 14 of the shaft 10 is below the diaphragm 24 and is, therefore, in fluid that is related to the fluid being measured.

If desired, the gasket 30 may originally have been secured to the diaphragm 24 or it may have been molded into the diaphragm 24. Also the diaphragm 24, the gasket 30 and the retainer 26 may be one piece.

The various components of coupling assemblies 58 and 59 may be made of any suitable materials for accomplishing the purpose.

In FIGURES 2 and 3, when manufacturing, the hub 22 or 23 is assembled on the shaft 10. Then, the diaphragm 24 together with the retainer 26 is seal-bonded to the shaft portion of the shaft hub assembly. Thereafter, the stationary raceway 28 or 29 is inserted in the partition wall recess 50 and the above assembly is also placed on top of the raceway 28 or 29 in the recess 50. Then, the gasket seal 30 is placed in the recess 50 on top of the diaphragm 24. Then, insert the diaphragm seal retainer 32 in the recess 50 on top of the seal 30. The crimp 44 is now made during which the gasket seal 30 is formed into sealing relation with the diaphragm 24 and the recessed portion of the wall 34.

The nutating shaft assembly now completed is ready to receive the prime mover element, which is the driver 16. In the assembly of the prime mover element, the lower end 14 of the nutating shaft 10 engages the funnel 18, which causes the shaft 10 to move into its angular position in the driving notch 20 of the driver 16. Thereby, the driver 16 causes the lower end 14 of the nutating shaft 10 to move in a circular path without causing the nutating shaft 10 to rotate about its own axis (see FIGURE 1). The driving notch 20 of the driver 16 determines the diameter of the nutating drive circle or outward extent of the nutation movement of the nutating shaft 10.

FIGURE 3 shows that the nutating shaft 10, the diaphragm 24, the gasket 30, the retaining ring 32, and shaft retainer 26 are preferably substantially identical with those of FIGURE 2.

The lower part of the nutating construction may be surrounded by the cylindrical screen 36 (see FIGURE 1), which may be sufficiently fine to filter out particles of practically micronic dimensions.

THE MECHANICAL OR MAGNETIC OR OTHER REGISTERING OF SHAFT NUTATIONS

For mechanical registration of the number of shaft nutations, the nutating shaft 10 engages the torque arm member 38 (see FIGURE 1).

One essential feature of this invention is placing a driving or primary magnet on the nutating shaft on one side of a separation-sealed nonpermeable diaphragm where the magnet will not be disturbed by electrical currents or damaging electrolysis that may be functionally present in the fluid on the other side of the diaphragm and within the fluid in which is located the prime mover of the same nutating shaft. In FIGURES 5 and 6, for magnetic registration of the number of nutations, a permanent bar magnet 250 is affixed to the upper end 12 of a nutating shaft 10a, which may be mounted in th same manner as the shaft 10 of FIGURES 2 and 3. The permanent bar magnet 250 affixed to the nutating shaft 10a may operate one or more remote registering or printing or other purpose controls and at the same time magnetically drive a conventional register.

FIGURE 5 shows an embodiment in which the nutating shaft 10a is similar to that shown in FIGURES 2 and 3. The shaft 10a is used to produce magnetic impulses as the shaft 10a nutates. For example, the permanent bar magnet 250 or the like is attached to the nutating shaft 10a, which is preferably of non-magnetic material. A plurality of radially extending pins 252 of intermittently magnetically permeable but non-retentive magnetic material is arranged around the upper end of the magnet 250 so that the upper end of the magnet 250 can nutate around and serially come into magnetic proximity to each of the pins 252. Any magnetically motivated electrical and electronic circuit coupling devices may be used to receive the magnetic impulses that are produced in the pins 252.

In FIGURE 6, the magnet 250 and the pins 252 may be identical to those shown in FIGURE 5 and may actuate devices such as described in connection with FIGURE 5. In addition, a permanent rotating bar magnet 254 may be mounted at the bottom of a rotary shaft 256, which is adapted to drive in rotation any desired device. Once the bar magnet 250 has attracted one end of the bar magnet 254, such end of the bar magnet 254 will follow the rotation or nutation of the magnet 250 to cause rotation of the shaft 256. Conveniently, the shaft 256 may be made of non-magnetic metal. The shaft 256 may rotate any desired device.

In the embodiment of FIGURE 7, a nutating shaft 10b may be substantially the same as the shafts 10 of FIGURES 2 and 3 and may be nutated and supported by the structures shown in FIGURES 2 and 3. The upper end of the shaft 10b of FIGURE 7 may be coupled to a horizontal rotating member 258, which may be made of non-magnetic material.

The member 258 may be supported on a bearing pin 260, which is rotatively mounted in a wall 260a, which may be non-magnetic, so that the member 258 can rotate about the bearing pin 260. A permanent bar magnet 262 may be attached to one end of the rotating member 258 so that the permanent bar magnet 262 is rotated about the pin 260.

A stationary bar 264 of non-permanent magnetic material, such as core iron, may be placed radially around the path of the rotation of magnet 262. A magnetic induction, electrically conductive coil 266 may surround the bar 264, and this coil may be connected to electric conductors 268 and 270. The conductors 268 and 270 may be attached to any device that is capable of being actuated by the electric current produced in the coil 266 as the bar magnet 262 passes the end of the bar 264 to induce current in the coil 266 and the conductors 268 and 270. It will be understood that additional bars similar to 264 such as bar 264a having conductors 268a may be provided radially about the path of rotation of the magnet 262.

In FIGURE 8, a nutating shaft 10c may be substantially similar to that shown in FIGURES 2 and 3. The full diaphragm construction 24 is to be included in the actual construction, but it is not illustrated in FIGURE 8. The upper end 12 of the shaft 10c may be rotatively driving-connected to a bar or disc 272. For example, the bar 272 may be an electrically conductive bar, which is electrically insulated from the shaft 10c either by making the shaft 10c of non-electrically conductive material or by making an electrically non-conductive joint between the shaft 10c and the bar 272. The bar 272 may be rotatively supported by a pin 274 on a plate 276 of insulative material so that electric current cannot pass through the plate 276.

Electric conductors such as wires 278 and 280 or the like may have spring contacting ends, which permit the bar 272 to make electrical connection with the contacting ends. The conductors 278 and 280 may be connected in any circuit, which is to be controlled by the making and breaking of the contacts as the bar 272 passes the conductors 278 and 280. If desired, other pairs of conductors may be placed in planes radially around the path of the rotation of the bar 272 so that other pairs of conductors may be electrically bridged by the bar 272 as it connectingly passes such other pairs of conductors.

FIGURE 9 shows an embodiment including a nutating shaft 10d, which is similar to the shaft 10 of FIGURES 2 and 3. The shaft 10d is used to produce magnetic impulses in the same manner as the shaft 10. The full diaphragm construction 24 is to be included in the actual construction of FIGURE 9 but is not illustrated therein.

The upper end of the shaft 10d, which is of non-magnetic material, is coupled to a horizontal rotating permanent bar magnet 290. The magnet 290 is supported on a bearing pin 292, which is rotatably mounted in a wall 294 or other support structure of non-magnetic material so that the magnet 290 may rotate about the axis of the bearing pin 292 when the shaft 10d nutates.

The wall 294 supports bars 296 and 298, which are diametrically disposed with respect to each other. Each of the bars 296 and 298 has one of its ends adjacent the rotating path of the bar magnet 290. Each of the bars 296 and 298 is formed of a magnetically permeable but non-retentive magnetic material such as core iron, for example.

As the shaft 10d nutates in the manner described in FIGURES 2 and 3 with respect to the shaft 10, the north and south poles of the magnet 290 pass the stationary bars 296 and 298. When the north pole of the magnet 290 is adjacent the bar 296, the south pole of the magnet 290 is adjacent the bar 298. Thus, impulses of opposite polarity are induced in the bars 296 and 298 due to their momentary magnetization by the magnet 290. These impulses may be employed to trigger other elements to provide either immediate or remote registering, signals, signalling, receipt printing, or other required functions.

The structure of FIGURE 10 is the same as FIGURE 9 except that a magnetic induction, electrically conductive coil 300 surrounds the bar 296 and a magnetic induction, electrically conductive coil 302 surrounds the bar 298. The coil 300 is connected to electrical conductors 304 and 306 while the coil 302 is connected to electrical conductors 308 and 310.

As each of the poles of the magnet 290 passes each of the bars 296 and 298, spaced, positive and negative (upper and lower) alternating sine curve signals occur within each of the coils 300 and 302 with the positive signal occurring in one while the negative signal is induced in the other. The conductors 304, 306 and 308, 310 are attached to devices that are capable of being actuated by the interrupted current in the coils 300 and 302, respectively, by each of the poles of the magnet 290 passing the bars 296 and 298.

Referring to FIGURES 11-13, there is shown a non-magnetic rotating member 320, which rotates in the direction of arrow 322 of FIGURE 10 about vertical axis 324 (see FIGURE 11). The shaft 10d is coupled to the horizontal rotating member 320 to cause rotation thereof about the axis 324 when the shaft 10d nutates as described with respect to the shaft 10 of FIGURES 2 and 3.

A pair of permanent U-shaped magnets 326 and 328 is attached to one end of the non-magnetic member 320 in spaced vertical relation to each other. The magnet 326 is secured to the upper surface of the member 320 while the magnet 328 is connected to the lower surface of the member 320.

As shown in FIGURE 13, the magnet 326 has its north pole above the south pole of the magnet 328 in a plane substantially perpendicular to the planes of the magnets 326 and 328. The magnet 326 has its south pole disposed above the north pole of the magnet 328 in a plane substantially perpendicular to the planes of the magnets 326 and 328. The direction of rotation of the member 320 and the attached magnets 326 and 328 due to nutation of the shaft 10d is shown in FIGURE 13 by arrow 330.

A stationary U-shaped member 332, which is of non-permanent magnetic material such as core iron, for example, is disposed with an end of one leg adjacent the rotational path of the magnet 326 and an end of the other leg disposed adjacent the rotational path of the magnet 328 in magnetic coupling proximity. A magnetic induction, electrically conductive coil 334, is wound around the U-shaped member 332. The coil 334 is connected to electric conductors 336 and 338, which are attached to any device that is capable of being actuated bq electrical current within the coil 334.

During rotation of the member 320 by nutation of the shaft 10d, the south pole of the magnet 326 and the vertically aligned north pole of the magnet 328 pass the ends of the legs of the U-shaped member 332 to produce a field of lines of force in one direction within the member 332. When the north pole of the magnet 326 and the south pole of the magnet 328 pass the ends of the legs of the U-shaped member 332, a field of lines of force in the opposite direction is produced in the U-shaped member 332.

This magnetic push-pull force, produced by each of the pairs of spaced poles, results in a magneto electrical sine curve alternating current output within the coil 334. This output signal has a sufficient voltage to reduce or eliminate the requirement of any amplification to actuate the device connected to the conductors 336 and 338. While the non-magnetic member 320 is shown as being rotated by nutation of the shaft 10d, it should be understood that the device would be equally feasible with a rotating shaft, which is connected to the member 320, rather than a nutating shaft.

In contrast to the arrangement of FIGURE 13 the south and north poles of the same magnet may be positioned to first traverse the two stationary field poles of the member 332 then the following spaced north and south poles of the other magnet traverse in reverse polarity the same member 332.

While the hub and diaphragm mounting structure for the nutating shaft of FIGURE 2 has been shown with the modifications of FIGURES 5 to 13, it should be understood that the hub and diaphragm mounting structure for the nutating shaft of FIGURE 3 could be employed with the embodiments of FIGURES 5 to 13.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A fluid meter having a nutating shaft, including a rotatively mounted member coupled to one end of said shaft, said rotatively mounted member having a pair of U-shaped permanent magnets attached thereto on one end thereof in spaced relation to each other, each of said magnets opening away from the axis of rotation of said rotatively mounted member, each of said magnets having a north pole at the end of one leg and a south pole at the end of the other leg, one of said magnets having its north pole aligned with the south pole of the other of said magnets in a plane perpendicular to the planes of said magnets, said one magnet having its south pole aligned with the north pole of said other magnet in a plane perpendicular to the planes of said magnets, a stationarily mounted U-shaped member of momentarily magnetizable material, said U-shaped member having one leg disposed in the plane of said one magnet and its other leg disposed in the plane of said other magnet, the ends of said U-shaped member being disposed adjacent the rotating path of the ends of said legs of said U-shaped magnets in magnetic coupling proximity, and said U-shaped member having a current carrying wire wound thereon.

2. In a coupling having a nutating shaft, bearing means for supporting said shaft, said bearing means consisting of a stationary bearing raceway and a nutating hub on said nutating shaft wherein there is a bearing circle on said stationary bearing and a bearing circle on said nutating hub with both of said circles being of the same diameter and both of said circles making rolling point bearing contact at one point at a time throughout 360 degrees of nutation.

3. The combination according to claim 2 in which the bearing surface of said raceway provides for a circle of bearing contact and said nutating hub has a conical configuration.

4. The combination according to claim 2 wherein said hub has pilot means disposed in an opening in said stationary raceway to pilot said bearing surface of said hub in rolling bearing point engagement with said bearing surface of said raceway whereby the nutating shaft is centered during assembly and during loss of pressure.

5. A coupling having a nutating shaft wherein one end of said nutating shaft is actuated on a prime mover and the other end of said nutating shaft has magnet means attached thereto, and a plurality of magnets radially stationed in coupling proximity to said magnet means on said nutating shaft.

6. A coupling having a nutating shaft in which one end of the nutating shaft is actuated by a prime mover and the other end of said nutating shaft drivingly engages a rotatably mounted member having a magnet attached thereto, and at least one current carrying wire wound magnetic bar, said magnetic bar being positioned in magnetic coupling proximity to said magnet on said rotatively mounted member.

7. A coupling having a nutating shaft wherein one end of said nutating shaft is actuated on a prime mover and the other end of said nutating shaft has magnet means attached thereto including a rotatively mounted magnet coupled to one end of said shaft, and a pair of diametrically disposed momentarily magnetizable members disposed adjacent the rotating path of said magnet in magnetic coupling proximity.

8. The combination according to claim 7 in which each of said members has a current carrying wire wound thereon.

References Cited

UNITED STATES PATENTS

| | | | |
|---|---|---|---|
| 2,702,897 | 2/1955 | Dewey | 340—195 X |
| 2,921,468 | 1/1960 | Treff et al. | 73—258 |
| 2,243,555 | 5/1941 | Faus | 310—103 |
| 2,306,360 | 12/1942 | Stuart | 310—156 X |
| 2,417,108 | 3/1947 | Guibert | 74—18.1 X |
| 2,432,234 | 12/1947 | Girard | 310—103 |
| 2,475,573 | 7/1949 | Smith | 310—103 X |
| 2,816,754 | 12/1957 | Kaufman | 318—228 X |
| 2,841,745 | 7/1958 | Shields | 310—156 X |
| 3,177,369 | 4/1965 | Zotos | 310—156 X |
| 3,354,329 | 11/1967 | Reich | 310—156 X |

WARREN E. RAY, Primary Examiner

U.S. Cl. X.R.

73—258; 74—18.1, 60; 290—43; 308—142; 310—156; 340—192, 203